US011525493B2

(12) United States Patent
Hoff

(10) Patent No.: US 11,525,493 B2
(45) Date of Patent: Dec. 13, 2022

(54) TORSIONAL VIBRATION DAMPER WITH CENTERED FLANGES

(71) Applicant: Schaeffler Technologies AG & Co. KG, Herzogenaurach (DE)

(72) Inventor: Austin Hoff, New Franklin, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 518 days.

(21) Appl. No.: 16/720,954

(22) Filed: Dec. 19, 2019

(65) Prior Publication Data

US 2021/0190187 A1 Jun. 24, 2021

(51) Int. Cl.
*F16F 15/10* (2006.01)
*F16F 15/123* (2006.01)
*F16F 15/134* (2006.01)
*F16H 45/02* (2006.01)

(52) U.S. Cl.
CPC .... *F16F 15/12353* (2013.01); *F16F 15/1232* (2013.01); *F16F 15/134* (2013.01); *F16H 2045/0231* (2013.01)

(58) Field of Classification Search
CPC ...... F16F 15/12; F16F 15/121; F16F 15/1213; F16F 15/1232; F16F 15/12353; F16F 15/12366; F16F 15/13128; F16F 15/13142; F16F 15/133; F16F 15/134; F16F 15/1343; F16F 15/13469; F16F 15/1428; F16H 2045/0231
See application file for complete search history.

(56) References Cited

U.S. PATENT DOCUMENTS

| | | | | | |
|---|---|---|---|---|---|
| 2,337,134 A | * | 12/1943 | Thelander | ............... | F16F 15/16 192/208 |
| 2,574,573 A | * | 11/1951 | Libby | ................. | F16F 15/1295 464/68.92 |
| 2,632,318 A | * | 3/1953 | Meyer | ...................... | F16D 3/66 464/81 |
| 4,347,717 A | * | 9/1982 | Lamarche | ........... | F16F 15/1234 464/62.1 |

(Continued)

FOREIGN PATENT DOCUMENTS

| | | | | |
|---|---|---|---|---|
| DE | 102014215584 A1 | * | 2/2016 | ............ F16F 15/131 |
| DE | 112019001688 T5 | * | 12/2020 | ........ F16F 15/12366 |

(Continued)

*Primary Examiner* — Adam D Rogers
(74) *Attorney, Agent, or Firm* — Volpe Koenig

(57) ABSTRACT

A torsional vibration damper, including: an output flange supported for rotation around an axis of rotation and including a first drive surface and a second drive surface; an intermediate flange including a first drive tab aligned in series with the first drive surface in a circumferential direction around the axis of rotation and a second drive tab aligned in series with the second drive surface in the circumferential direction; a first spring including a first end directly engaged with the first drive surface and a second end directly engaged with the first drive tab; and a second spring including a first end directly engaged with the second drive tab and a second end directly engaged with the second drive surface. In an example embodiment, the intermediate flange includes a centering tab in contact with the output flange and arranged to center the intermediate flange with respect to the output flange.

19 Claims, 16 Drawing Sheets

(56) References Cited

U.S. PATENT DOCUMENTS

| | | | | |
|---|---|---|---|---|
| 4,585,427 | A * | 4/1986 | Lamarche | F16F 15/1234 |
| | | | | 464/68.92 |
| 4,947,700 | A * | 8/1990 | Kern | F16H 37/021 |
| | | | | 464/7 |
| 5,020,647 | A * | 6/1991 | Fujimoto | F16F 15/1234 |
| | | | | 192/3.33 |
| 6,106,400 | A * | 8/2000 | Mizukami | F16H 45/02 |
| | | | | 464/68.92 |
| 6,244,401 | B1 | 6/2001 | Maienschein et al. | |
| 3,025,136 | A1 | 9/2011 | Uhler | |
| 8,801,524 | B2 * | 8/2014 | Takikawa | F16F 15/12366 |
| | | | | 464/67.1 |
| 10,047,845 | B2 * | 8/2018 | Depraete | F16D 3/12 |
| 10,895,302 | B2 * | 1/2021 | Ito | F16F 15/1414 |
| 2020/0386275 | A1 * | 12/2020 | Murata | F16F 15/13415 |

FOREIGN PATENT DOCUMENTS

| | | | | |
|---|---|---|---|---|
| GB | 2066416 A * | 7/1981 | | F16F 15/1202 |
| WO | WO-9945294 A1 * | 9/1999 | | F16H 45/02 |

* cited by examiner

TORSIONAL VIBRATION DAMPER WITH CENTERED FLANGES

TECHNICAL FIELD

The present disclosure relates to an in-line torsional vibration damper with flanges centered on a circumferential center line of the springs for the torsional vibration damper and to an in-line torsional vibration damper with an intermediate flange centered on an output flange.

BACKGROUND

For known in-line torsional vibration dampers, an intermediate flange, an output flange, and two sets of springs are sandwiched between two cover plates. Only one of the intermediate flange or the output flange can be centered on a circumferential center line of the springs. The off-center flange causes an unequal distribution of loads on the springs and bending of the springs.

SUMMARY

According to aspects illustrated herein, there is provided a torsional vibration damper, including: an output flange supported for rotation around an axis of rotation and including a first drive surface and a second drive surface; an intermediate flange including a first drive tab aligned in series with the first drive surface in a circumferential direction around the axis of rotation and a second drive tab aligned in series with the second drive surface in the circumferential direction; a first spring including a first end directly engaged with the first drive surface and a second end directly engaged with the first drive tab; and a second spring including a first end directly engaged with the second drive tab and a second end directly engaged with the second drive surface.

According to aspects illustrated herein, there is provided a torsional vibration damper, including: an output flange supported for rotation around an axis of rotation and including a radially outwardly facing surface; an intermediate flange including a centering tab in contact with the radially outwardly facing surface and arranged to center the intermediate flange with respect to the output flange; a first spring including a first end directly engaged with the output flange and a second end directly engaged with the intermediate flange; and a second spring including a first end directly engaged with the intermediate flange and a second end directly engaged with the output flange.

According to aspects illustrated herein, there is provided a method of operating a torsional vibration damper, including: receiving, with a cover plate of the torsional vibration damper, a rotational torque in a circumferential direction; rotating, in the circumferential direction, the cover plate around an axis of rotation of the torsional vibration damper; transmitting, the rotational torque to a first end of a first spring of the torsional vibration damper, the first end directly engaged with the cover plate; transmitting, with a second end of the first spring, the rotational torque to a first drive tab of an intermediate flange of the torsional vibration damper, the first drive tab directly engaged with the first end of the first spring; rotating the intermediate flange in the circumferential direction; transmitting, with a second drive tab of the intermediate flange, the rotational torque to a first end of a second spring of the torsional vibration damper, the first end of the second spring directly engaged with the second drive tab; transmitting, with a second end of the second spring, the rotational torque to a drive surface of an output flange of the torsional vibration damper, the second end of the second spring directly engaged with the drive surface; and rotating the output flange in the circumferential direction. Transmitting, with the second end of the second spring, the rotational torque to the drive surface of the output flange includes transmitting the rotational torque to the drive surface overlapping the first drive tab and the second drive tab in the circumferential direction; or rotating the intermediate flange in the circumferential direction includes centering the intermediate flange, with respect to the output flange, using a centering tab of the intermediate flange in contact with a radially outwardly facing surface of the output flange.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
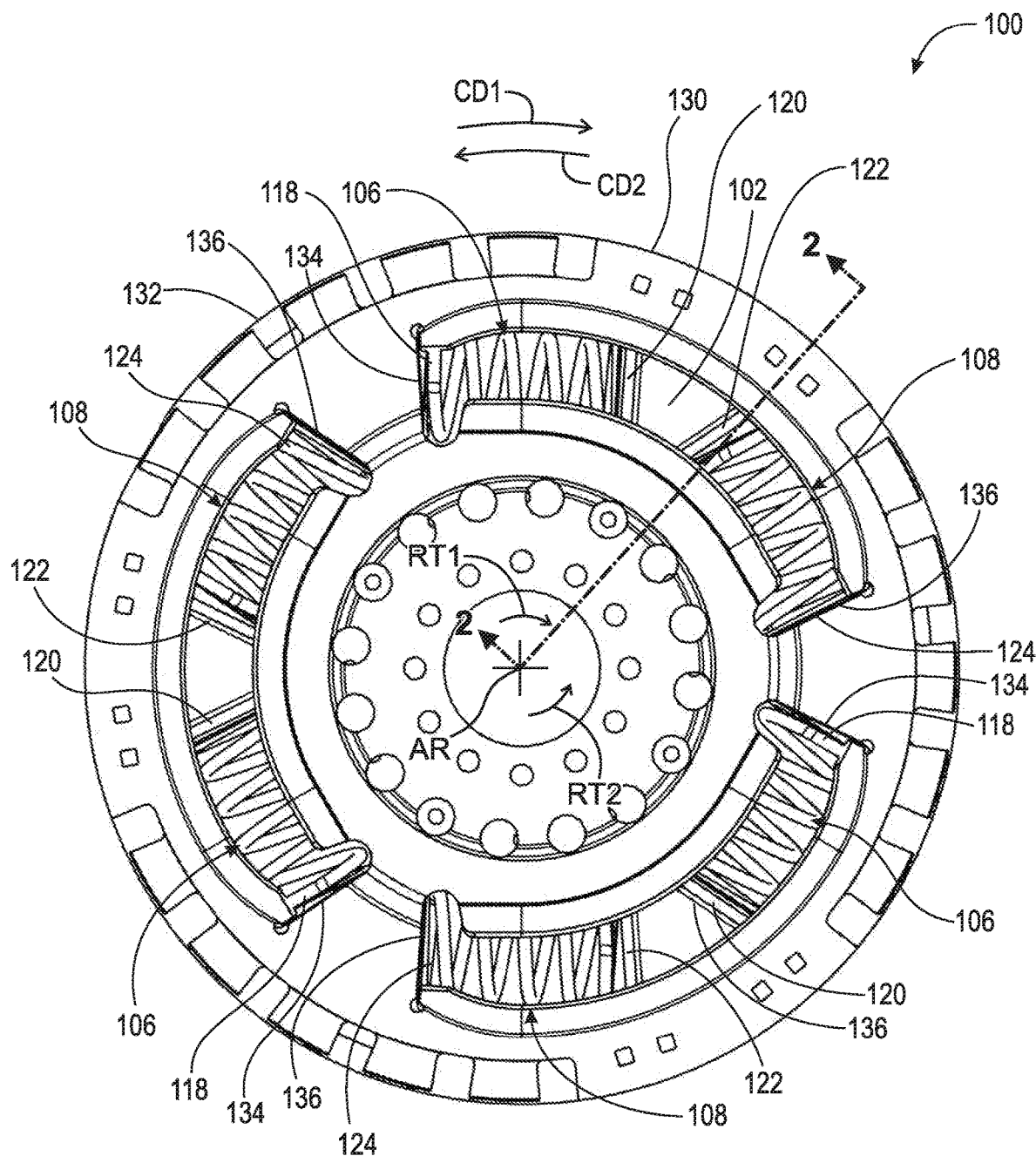
FIG. 1 is a front view of a torsional vibration damper with a centered intermediate flange.

FIG. 1 is a front view of torsional vibration damper 100 with a centered intermediate flange.

Figure 2:
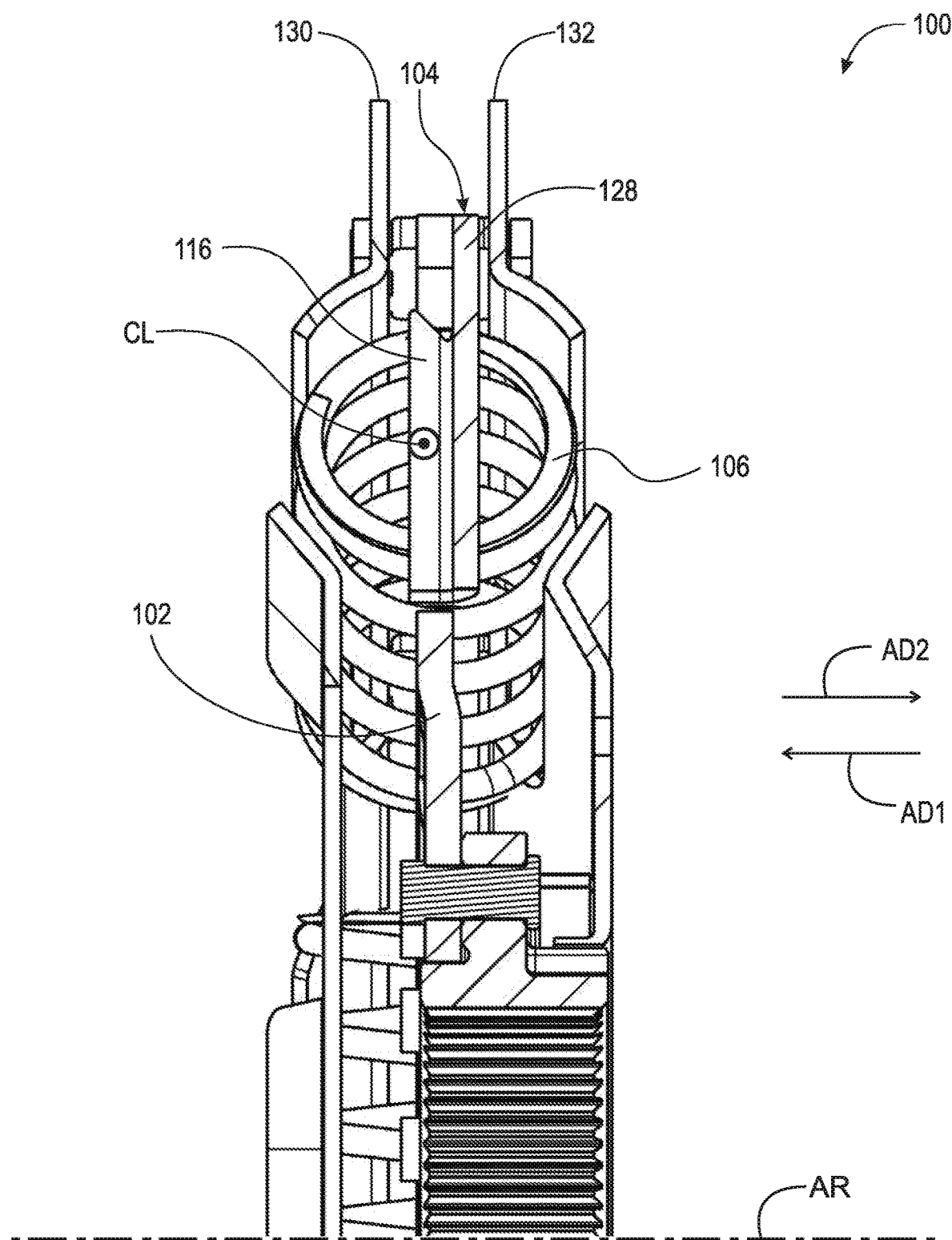
FIG. 2 is a cross-sectional view generally along line 2-2 in FIG. 1.

FIG. 2 is a cross-sectional view generally along line 2-2 in FIG. 1.

Figure 3:
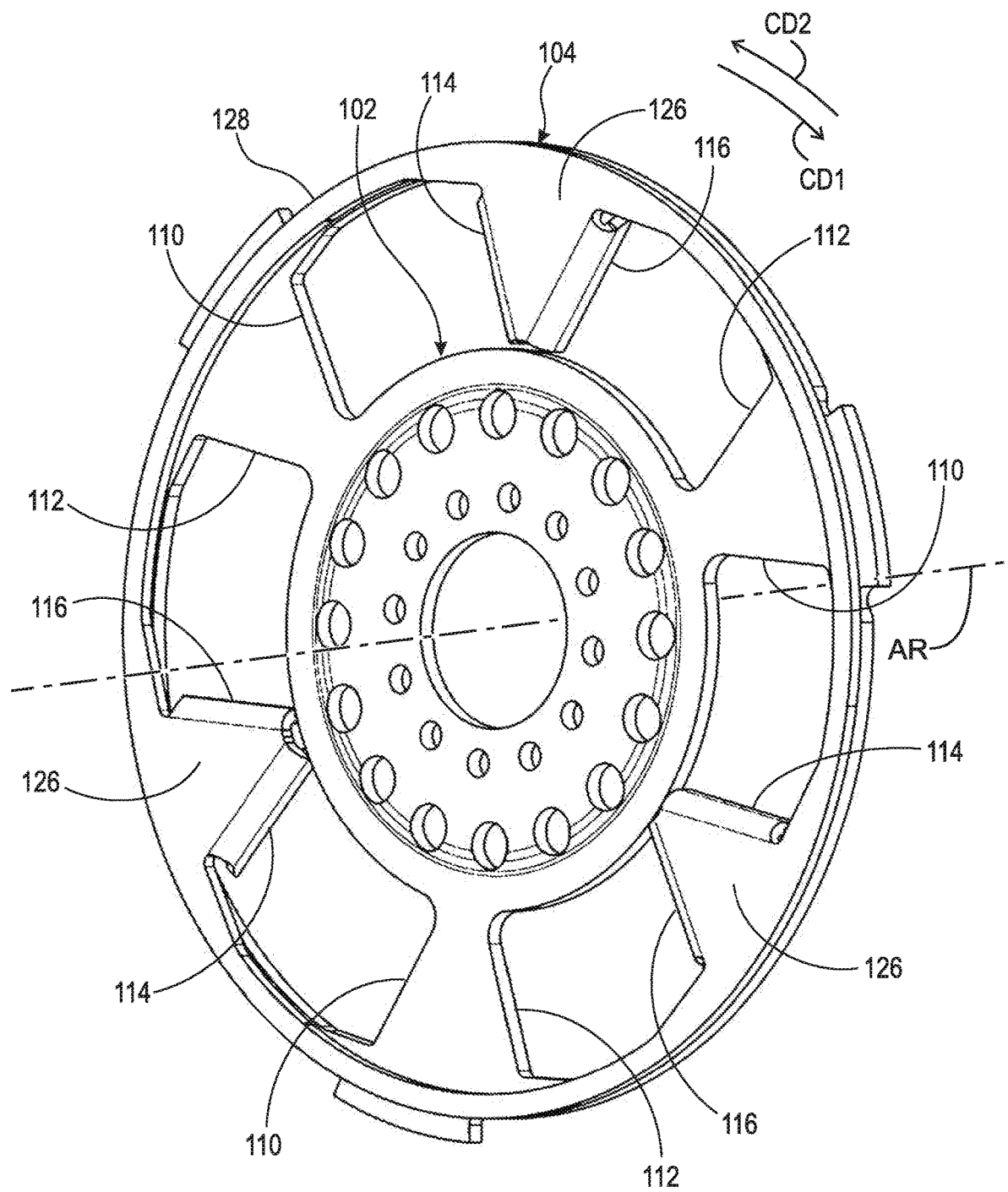
FIG. 3 is a front isometric view of an output flange and the centered intermediate flange of the torsional vibration damper shown in FIG. 1.

FIG. 3 is a front isometric view of an output flange and the centered intermediate flange of torsional vibration damper 100 shown in FIG. 2.

Figure 4:
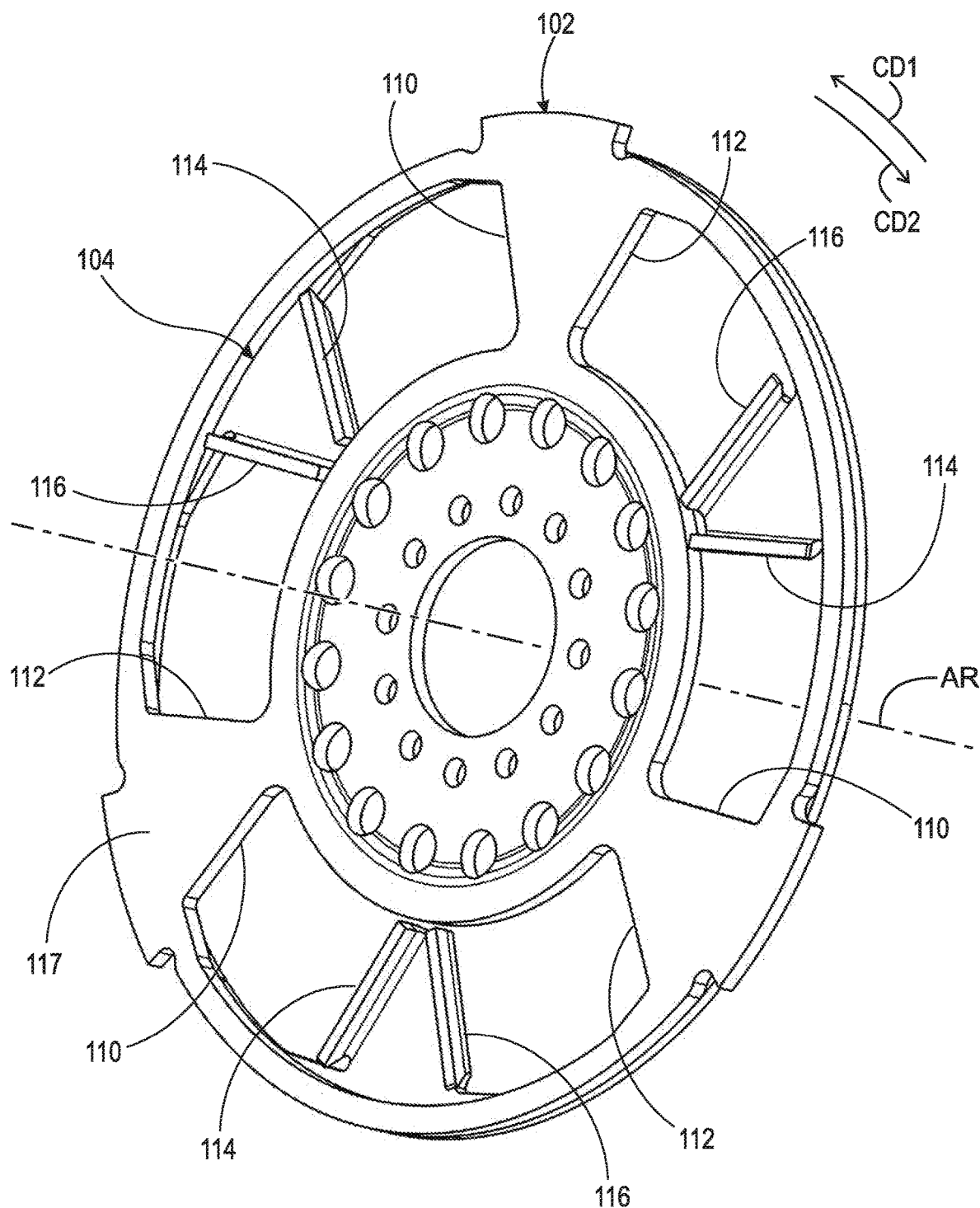
FIG. 4 is a back isometric view of the output flange and the centered intermediate flange shown in FIG. 3.

FIG. 4 is a back isometric view of the output flange and the centered intermediate flange shown in FIG. 3. The following should be viewed in light of FIGS. 1 through 4. Torsional vibration damper 100 includes: output flange 102 supported for rotation around axis of rotation AR; intermediate flange 104 supported for rotation around axis AR; springs 106; and springs 108. Output flange 102 includes drive surfaces 110 and drive surfaces 112. Intermediate flange 104 includes: drive tabs 114 and drive tabs 116.

Drive tabs 114 are aligned in series with drive surfaces 110 in circumferential direction CD1 around axis of rotation AR. Drive tabs 116 are aligned in series with drive surfaces 112 in direction CD1. A circumferential direction is illustrated by an end point of a radius rotated around axis AR. In the example of FIG. 1, drive surfaces 110, drive tabs 114, drive tabs 116, and drive surfaces 112 are aligned in series in direction CD1. Drive tabs 114 overlap drive surfaces 110 in circumferential direction CD1 and drive tabs 116 overlap drive surfaces 112 in circumferential direction CD1. In the example of FIG. 1, drive tabs 114 overlap drive surfaces 110 and drive surfaces 112 in circumferential direction CD1; and drive tabs 116 overlap drive surfaces 112 and drive surfaces 110 in circumferential direction CD1.

By "aligned in series in circumferential direction CD1" and "overlapping in circumferential direction CD1," we mean that hypothetical center line CL of springs 106 and springs 108 passes through drive surfaces 110 and 112, and drive tabs 114 and 116.

The configuration of output flange 102, intermediate flange 104, springs 106, and springs 108 is describable by an axial orientation. For example, drive tabs 114 and 116 extend, in direction AD1, parallel to axis AR, past surfaces 117 of output flange 102, facing in axial direction AD2, opposite direction AD1.

Each spring 106 includes: end 118 directly engaged with a respective drive surface 110; and end 120 directly engaged with a respective drive tab 114. Each spring 108 includes: end 122 directly engaged with a respective drive tab 116; and end 124 directly engaged with a respective drive surface 112. By one component "directly engaged with" another component, we mean that the components are in direct contact, or that the components are in direct contact with one or more ancillary intermediate parts, for example, a cap fixed to an end of a spring, such that the components and the ancillary parts are mechanically solid.

In the example of FIG. 1, intermediate flange 104 includes surfaces 126 facing at least partially in axial direction AD2. For each surface 126, a respective drive tab 114 and a respective drive tab 116 extend from surface 126 at least partially in axial direction AD1. In an example embodiment, the respective drive tabs 114 and 116 extend from surfaces 126 only in direction AD1. In the example of FIG. 1, intermediate flange 104 includes circumferentially continuous annular portion 128, and surfaces 126 extend radially inwardly from circumferentially continuous annular portion 128. Drive tabs 114 and 116 extend past annular portion 128 in axial direction AD1.

Figure 5:
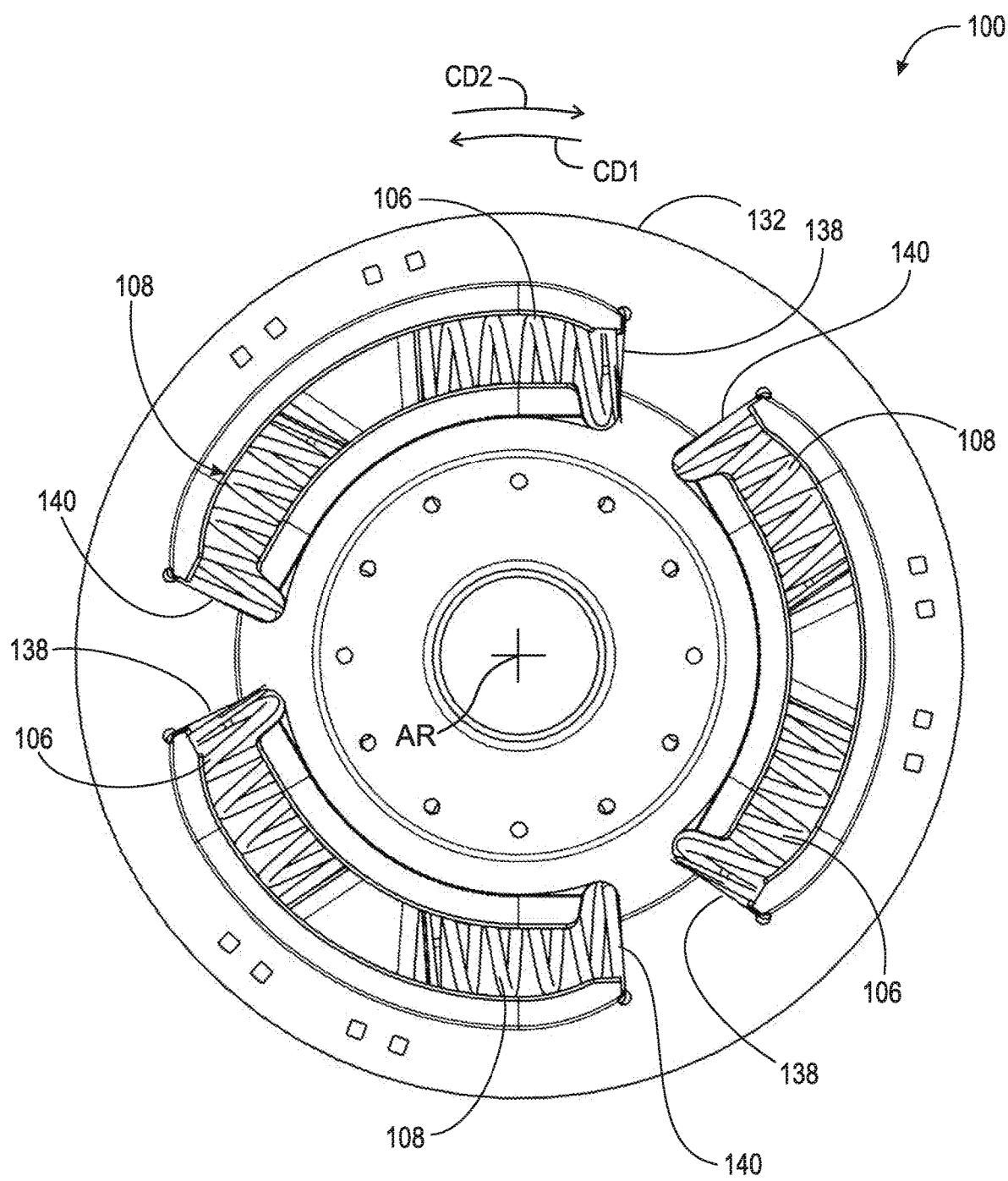
FIG. 5 is a back view of the torsional vibration damper shown in FIG. 1.

FIG. 5 is a back view of torsional vibration damper 100 shown in FIG. 1. The following should be viewed in light of FIGS. 1 through 5. In the example of FIG. 1, torsional vibration damper 100 includes cover plate 130 and cover plate 132, non-rotatably connected to cover plate 130. Cover plate 130 and cover plate 132 overlap output flange 102 and intermediate flange 104 in axial direction AD1. Output flange 102 and intermediate flange 104 are axially disposed between cover plate 130 and cover plate 132. Cover plate 130 includes: drive surfaces 134 directly engaged ends 118; and drive surfaces 136 directly engaged with ends 124. Cover plate 132 includes: drive surfaces 138 directly engaged ends 118; and drive surfaces 140 directly engaged with ends 124.

The following provides further detail regarding the structure and operation of torsional vibration damper 100. Cover plates 130 and 132 are arranged to receive rotational torque, for example, rotational torque RT1 in direction CD1, and rotate in the direction in which the torque is transmitted, for example direction CD1. Cover plates 130 and 132, via drive surfaces 134 and 138, are arranged to transmit rotational torque RT1 to springs 106. Springs 106 are arranged to transmit rotational torque RT1 to intermediate flange 104 via drive tabs 114, and intermediate flange 104 is arranged to rotate in direction CD1. Intermediate flange 104, via drive tabs 116, is arranged to transmit rotational torque RT1 to springs 108. Springs 108 are arranged to transmit, via drive surfaces 112, rotational torque RT1 to output flange 102. Output flange 102 is arranged to rotate in direction CD1, and transmit rotational torque RT1 to a device (not shown), such as a shaft, non-rotatably connected to output flange 102.

The above description of operation under torque RT1 is applicable to operation of torsional vibration damper 100 under torque RT2, received by cover plates 130 and 132, in direction CD2. Springs 106 and 108 dampen vibration associated with torque RT1 and torque RT2.

Figure 6:
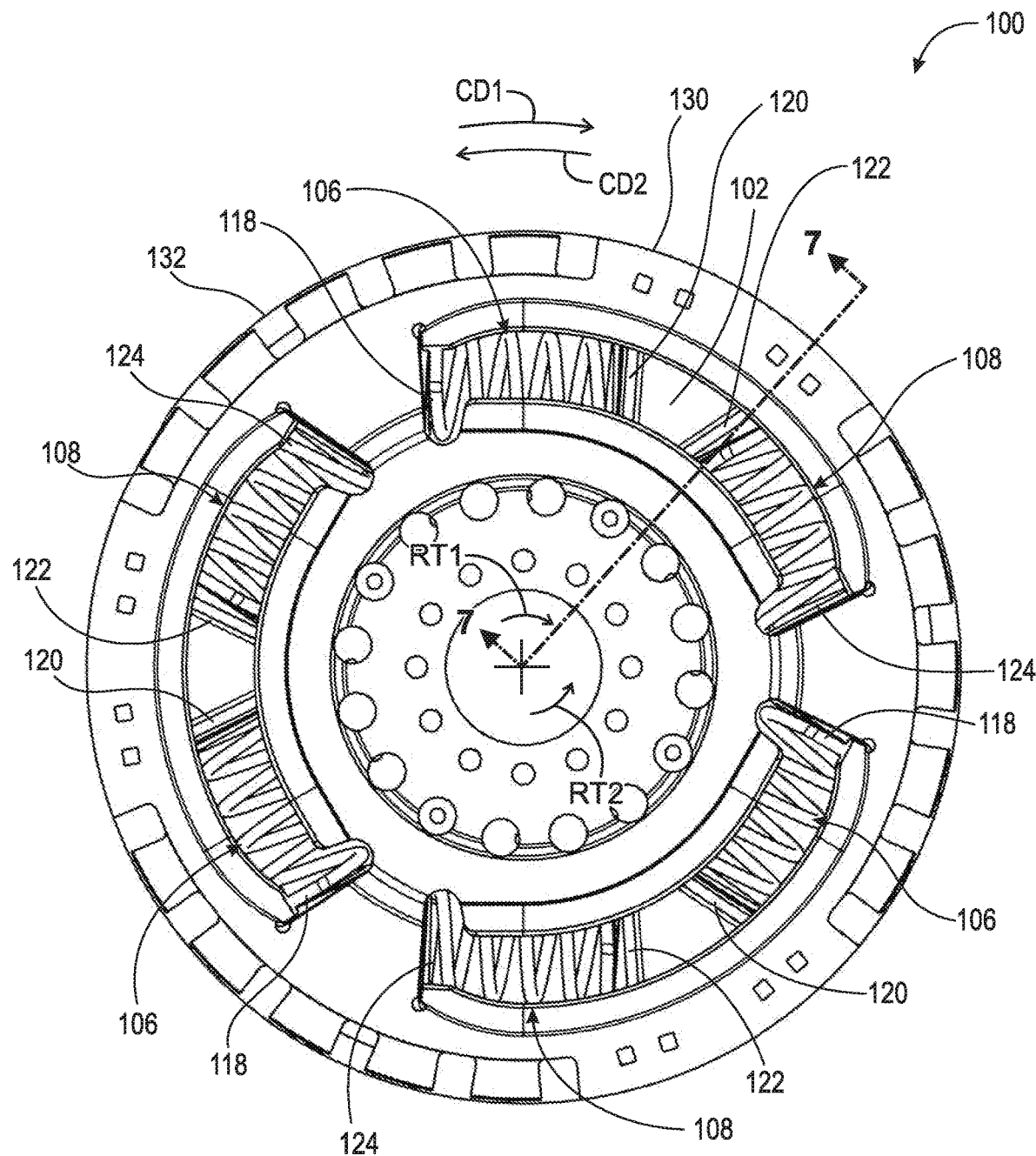
FIG. 6 is a front view of a torsional vibration damper with a centered intermediate flange.

FIG. 6 is a front view of torsional vibration damper 100 with a centered intermediate flange.

Figure 7:
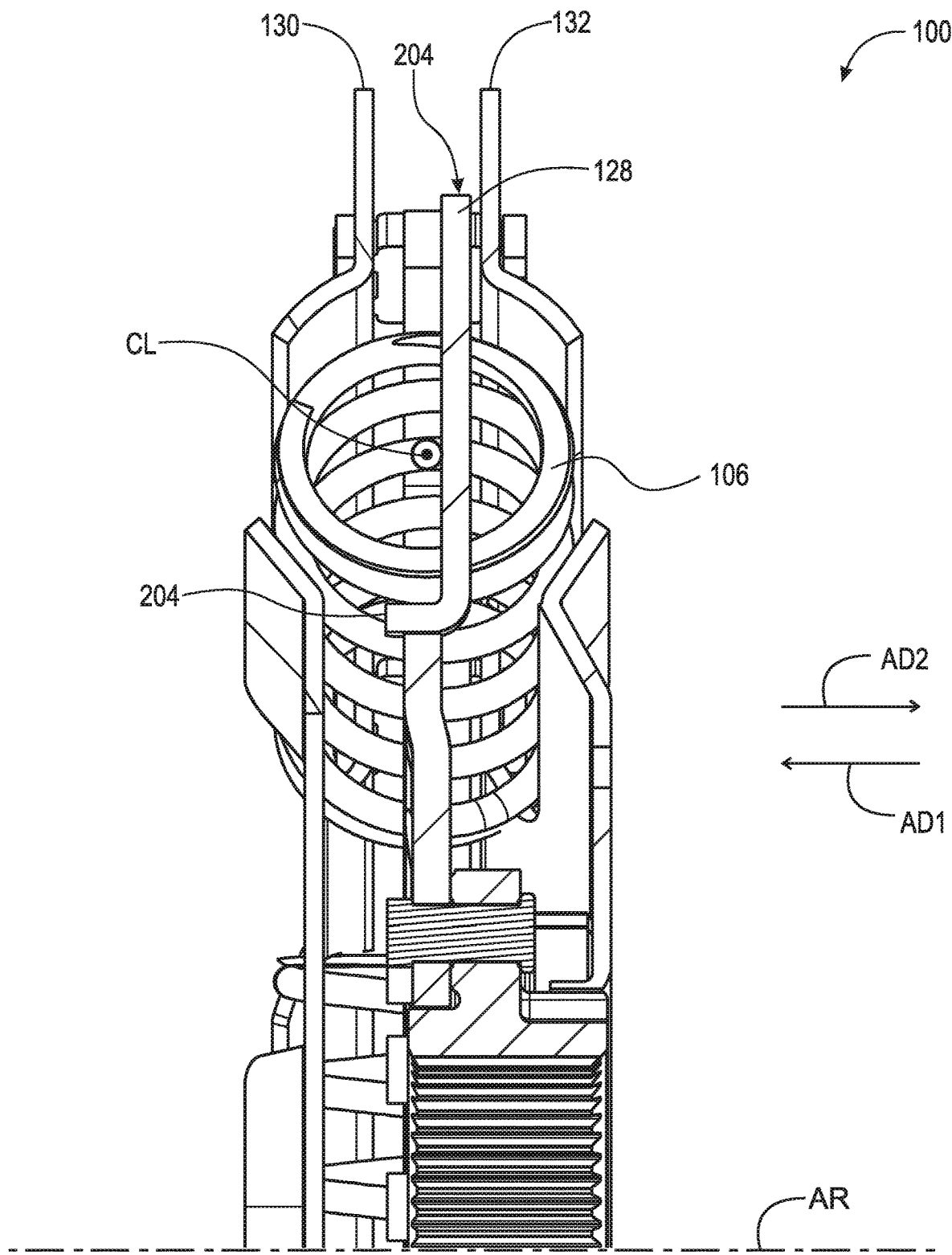
FIG. 7 is a cross-sectional view generally along line 7-7 in FIG. 6.

FIG. 7 is a cross-sectional view generally along line 7-7 in FIG. 6.

Figure 8:
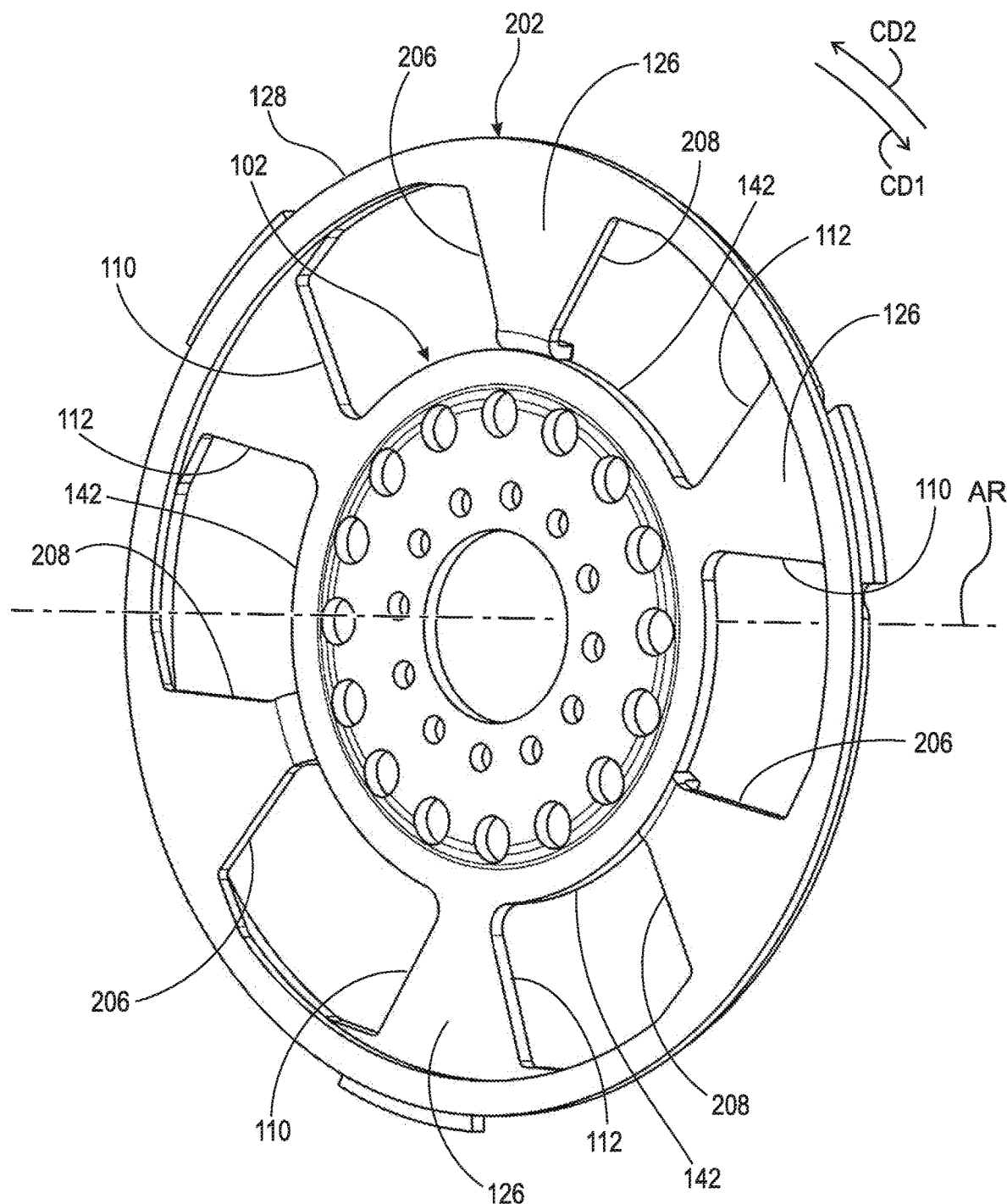
FIG. 8 is a front isometric view of an output flange and the centered intermediate flange of the torsional vibration damper shown in FIG. 6.

FIG. 8 is a front isometric view of an output flange and the centered intermediate flange of the torsional vibration damper shown in FIG. 6.

Figure 9:
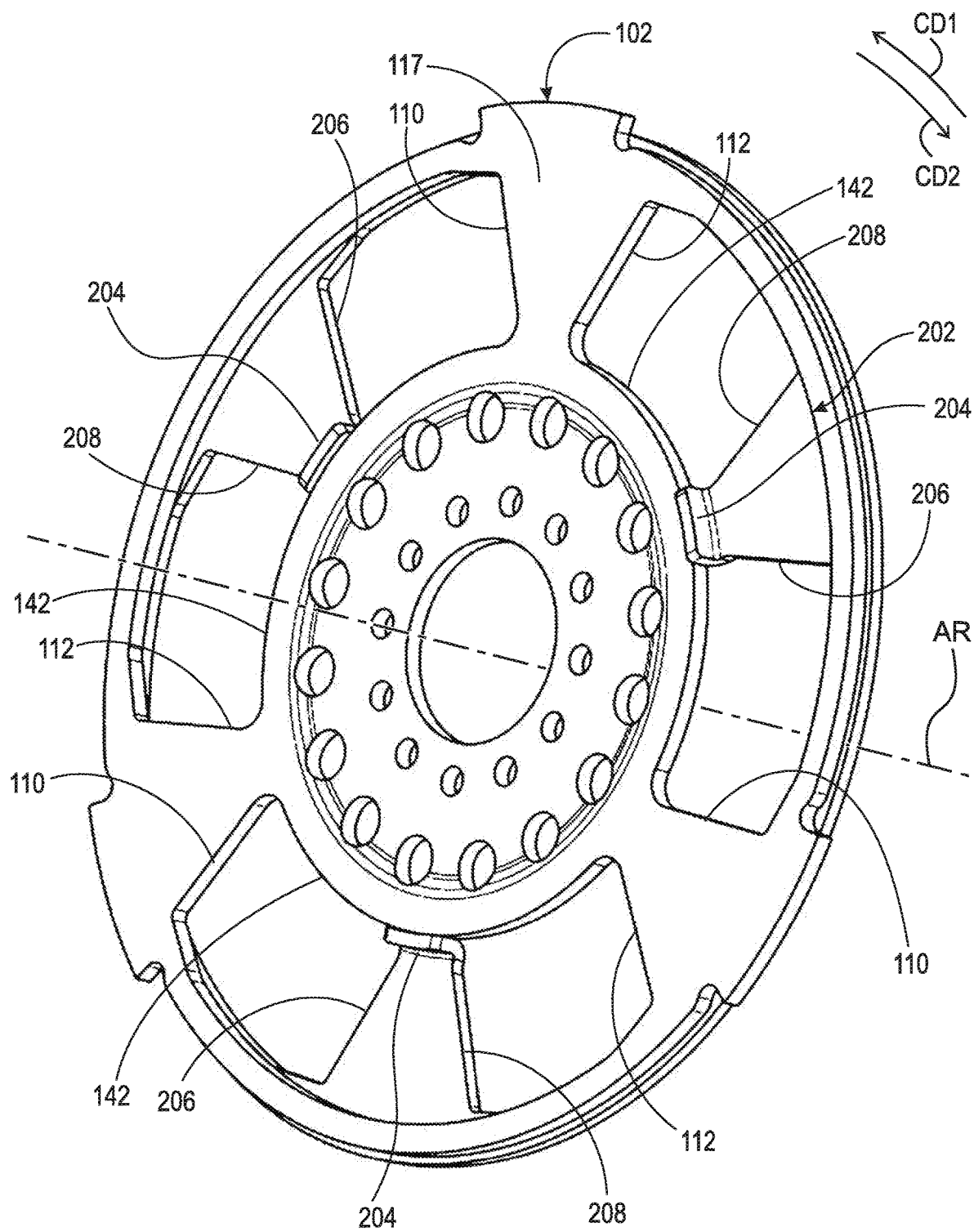
FIG. 9 is a back isometric view of the output flange and the centered intermediate flange shown in FIG. 8.

FIG. 9 is a back isometric view of the output flange and the centered intermediate flange shown in FIG. 8. The following should be viewed in light of FIGS. 6 through 9. In the example of FIG. 6, torsional vibration damper 100 includes: output flange 102 supported for rotation around axis of rotation AR; intermediate flange 202 supported for rotation around axis AR; springs 106; and springs 108. Output flange 102 includes radially outwardly facing surfaces 142. Intermediate flange 202 includes centering tabs 204 in contact with surfaces 142. Contact between tabs 204 and surfaces 142 centers intermediate flange 202 with respect to output flange 102 and axis of rotation AR.

In the example of FIG. 6, intermediate flange 202 includes surfaces 126 facing at least partially in axial direction AD1. For each surface 126, a respective centering tab 204 extends from surface 126 at least partially in axial direction AD1. In an example embodiment, the respective centering tabs 204 extend from surfaces 126 only in direction AD1. In the example of FIG. 6, intermediate flange 202 includes circumferentially continuous annular portion 128 and surfaces 126 extend radially inwardly from circumferentially continuous annular portion 128.

In the example of FIG. 6: output flange 102 includes drive surfaces 110 and drive surfaces 112; and intermediate flange 202 includes drive surfaces 206 and drive surfaces 208. Each spring 106 includes: end 118 directly engaged with a respective drive surface 110; and end 120 directly engaged with a respective drive surface 206. Each spring 108 includes: end 122 directly engaged with a respective drive surface 208; and end 124 directly engaged with a respective drive surface 112.

Figure 10:
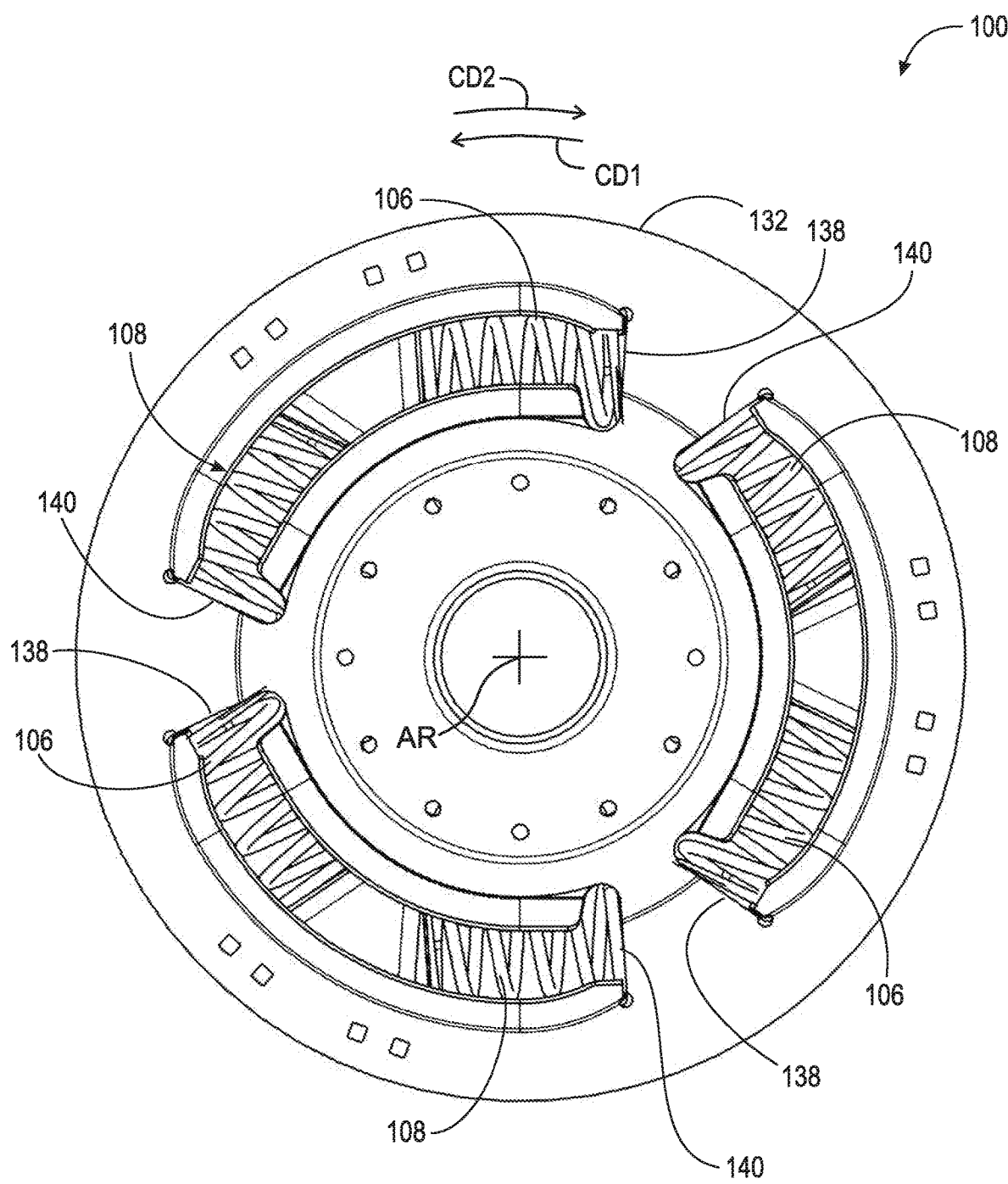
FIG. 10 a back view of the torsional vibration damper shown in FIG. 6.

FIG. 10 a back view of torsional vibration damper 100 shown in FIG. 6. The following should be viewed in light of FIGS. 6 through 10. In the example of FIG. 6, torsional vibration damper 100 includes cover plate 130 and cover plate 132, non-rotatably connected to cover plate 130. Cover plate 130 and cover plate 132 overlap output flange 102 and intermediate flange 202 in axial direction AD1. Output flange 102 and intermediate flange 202 are axially disposed between cover plate 130 and cover plate 132. Cover plate 130 includes: drive surfaces 134 directly engaged ends 118; and drive surfaces 136 directly engaged with ends 124. Cover plate 132 includes: drive surfaces 138 directly engaged ends 118; and drive surfaces 140 directly engaged with ends 124.

The following provides further detail regarding the structure and operation of torsional vibration damper 100. Cover plates 130 and 132 are arranged to receive rotational torque, for example, rotational torque RT1 in direction CD1, and rotate in the direction in which the torque is transmitted, for example direction CD1. Cover plates 130 and 132, via drive surfaces 134 and 138 are arranged to transmit rotational torque RT1 to springs 106. Springs 106 are arranged to transmit rotational torque RT1 to intermediate flange 104 via drive tabs 114, and intermediate flange 104 is arranged to rotate in direction CD1. Intermediate flange 104, via drive tabs 116, is arranged to transmit rotational torque RT1 to springs 108. Springs 108 are arranged to transmit, via drive surfaces 112, rotational torque RT1 to output flange 102. Output flange 102 is arranged to rotate in direction CD1, and transmit rotational torque RT1 to a device (not shown), such as a shaft, non-rotatably connected to output flange 102.

The above description of operation under torque RT1 is applicable to operation of torsional vibration damper 100, shown in FIG. 6, under torque RT2, received by cover plates 130 and 132, in direction CD2. Springs 106 and 108 dampen vibration associated with torque RT1 and torque RT2.

Figure 11:
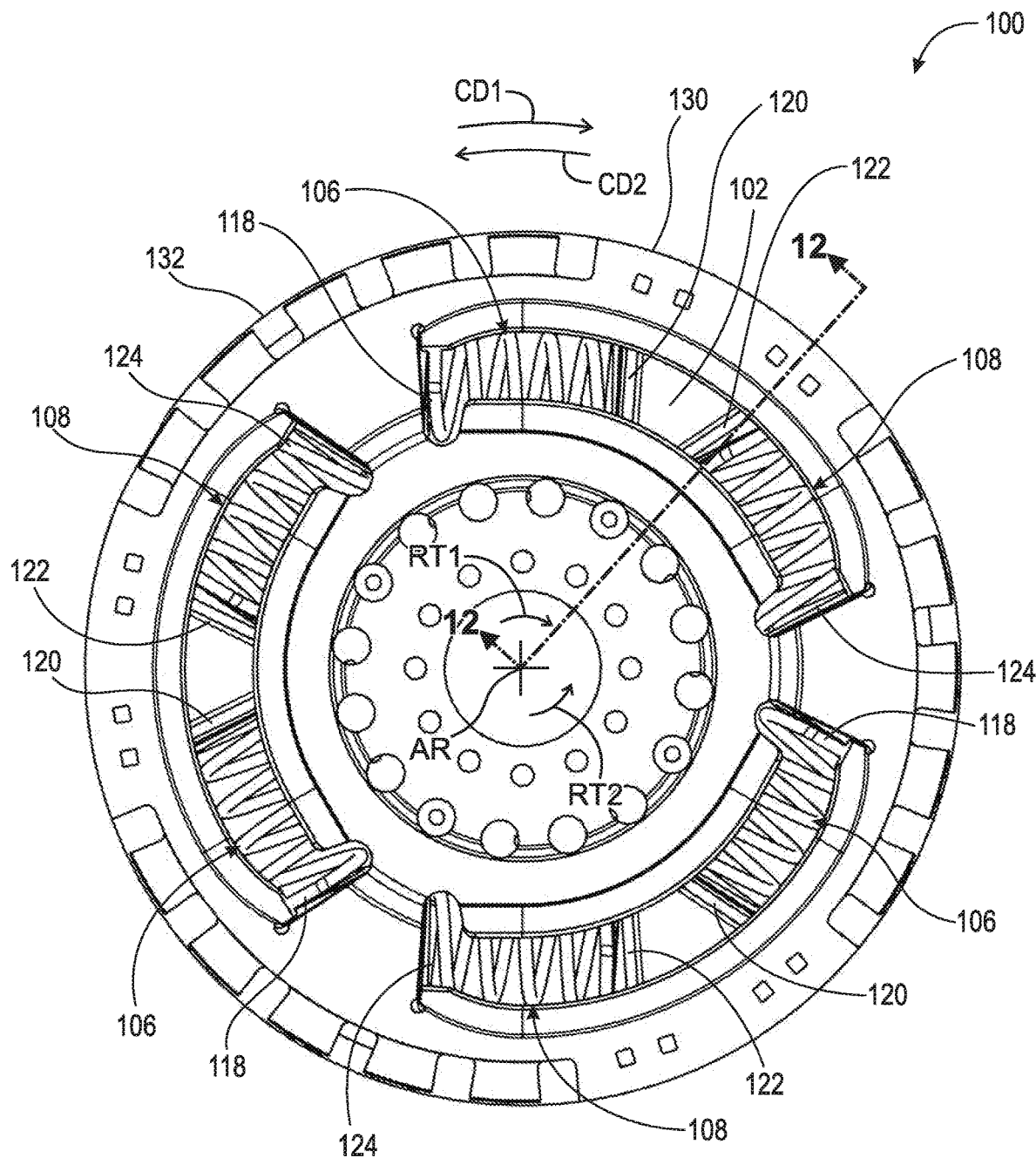
FIG. 11 a front view of a torsional vibration damper with a centered intermediate flange.

FIG. 11 is a front view of torsional vibration damper 100 with a centered intermediate flange.

Figure 12:
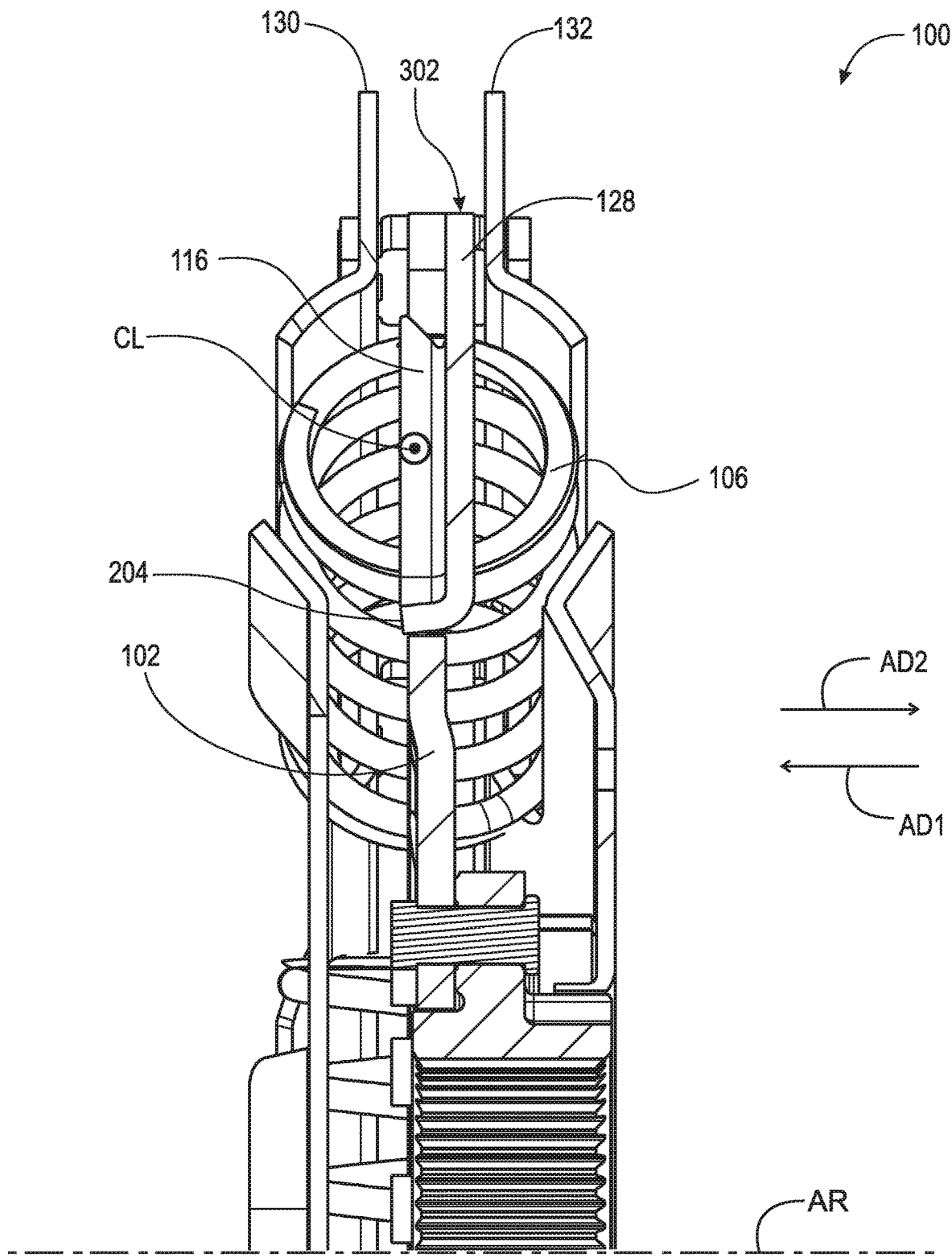
FIG. 12 is a cross-sectional view generally along line 12-12 in FIG. 11.

FIG. 12 is a cross-sectional view generally along line 12-12 in FIG. 11.

Figure 13:
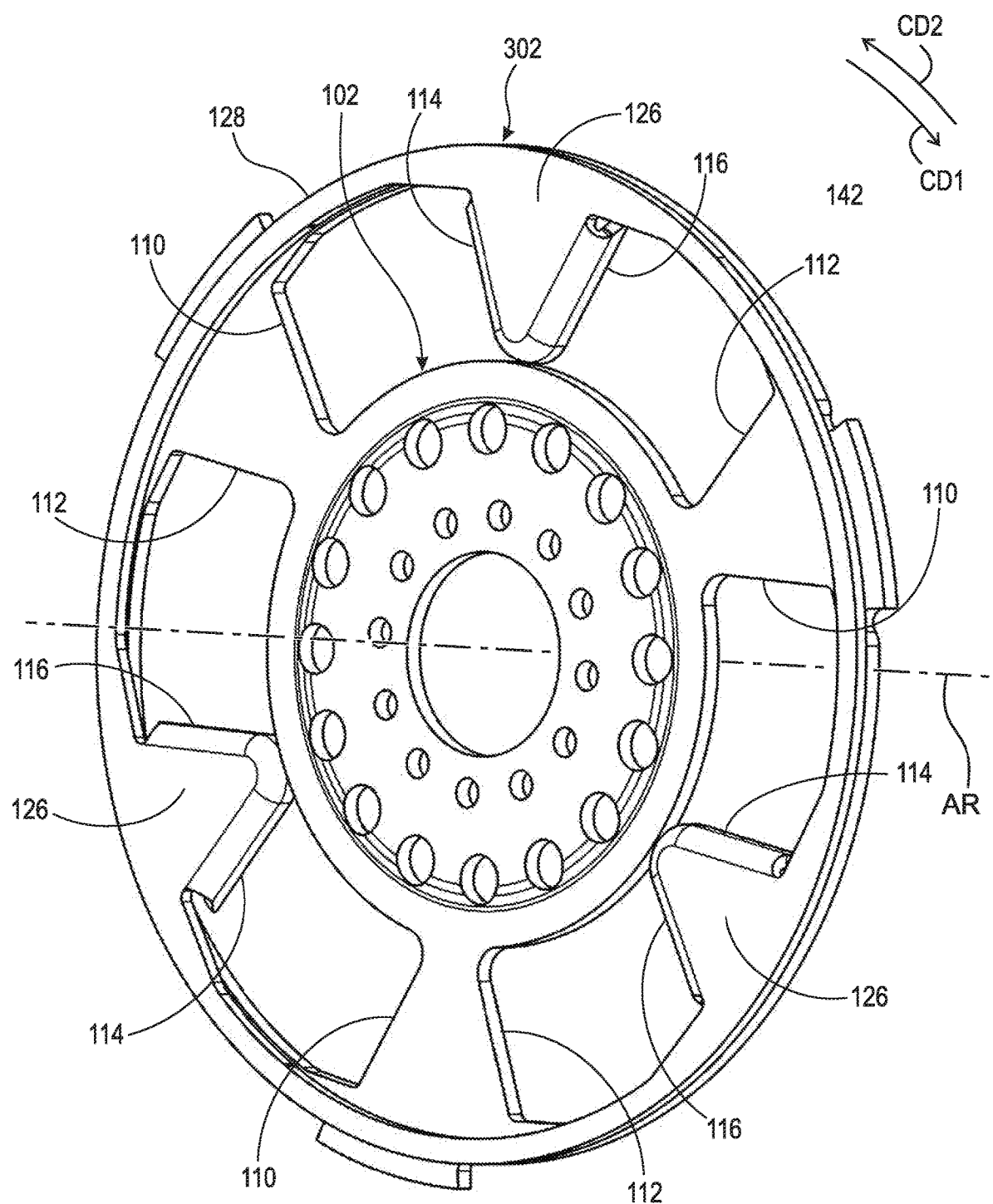
FIG. 13 is a front isometric view of an output flange and the centered intermediate flange of the torsional vibration damper shown in FIG. 11.

FIG. 13 is a front isometric view of an output flange and the centered intermediate flange of the torsional vibration damper shown in FIG. 11.

Figure 14:
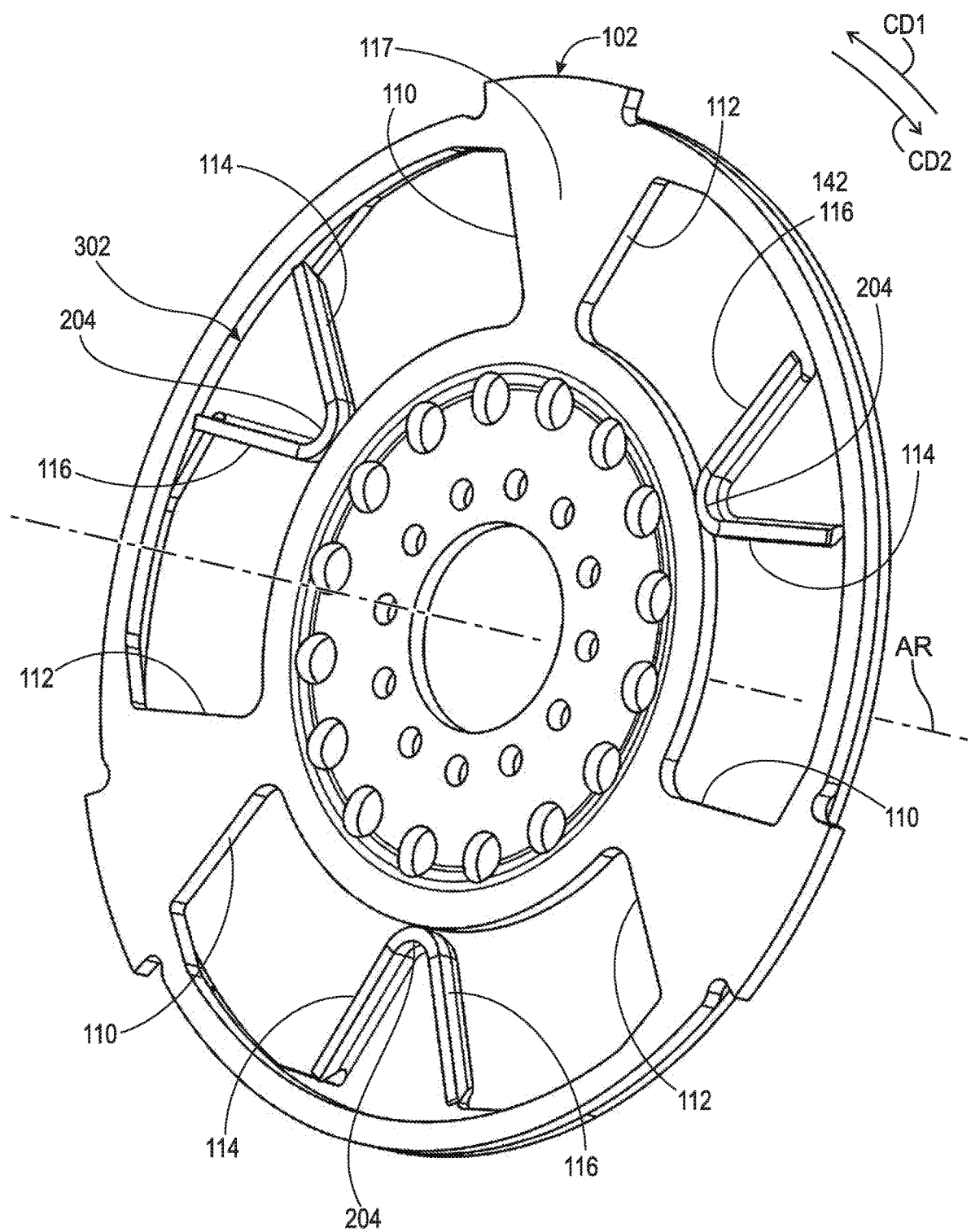
FIG. 14 is a back isometric view of the output flange and the centered intermediate flange shown in FIG. 11.

FIG. 14 is a back isometric view of the output flange and the centered intermediate flange shown in FIG. 11. The following should be viewed in light of FIGS. 11 through 14. In the example of FIG. 11, torsional vibration damper 100 includes: output flange 102 supported for rotation around axis of rotation AR; intermediate flange 302 supported for rotation around axis of rotation AR; springs 106; and springs 108. Output flange 102 includes drive surfaces 110 and drive surfaces 112. Intermediate flange 302 includes drive tabs 114 and drive tabs 116.

Drive tabs 114 are aligned in series with drive surfaces 110 in circumferential direction CD1 around axis of rotation AR. Drive tabs 116 are aligned in series with drive surfaces 112 in direction CD1. In the example of FIG. 10, drive surfaces 110, drive tabs 114, drive tabs 116, and drive surfaces 112 are aligned in series in direction CD1. Drive tabs 114 overlap drive surfaces 110 in circumferential direction CD1 and drive tabs 116 overlap drive surfaces 112 in circumferential direction CD1. In the example of FIG. 10, drive tabs 114 overlap drive surfaces 110 and drive surfaces 112 in circumferential direction CD1; and drive tabs 116 overlap drive surfaces 112 and drive surfaces 110 in circumferential direction CD1.

The configuration of output flange 102, intermediate flange 302, springs 106, and springs 108 is describable by an axial orientation. For example, drive tabs 114 and 116 extend, in direction AD1, past surfaces 117 of output flange 102, facing in axial direction AD2.

Each spring 106 includes: end 118 directly engaged with a respective drive surface 110; and end 120 directly engaged with a respective drive tab 114. Each spring 108 includes: end 122 directly engaged with a respective drive tab 116; and end 124 directly engaged with a respective drive surface 112.

In the example of FIG. 10, intermediate flange 302 includes surfaces 126 facing at least partially in axial direction AD2. For each surface 126, a respective drive tab 114 and a respective drive tab 116 extend from surface 126 at least partially in axial AD1. In an example embodiment, the respective drive tabs 114 and 116 extend from surface 126 only in direction AD1. In the example of FIG. 10, intermediate flange 302 includes circumferentially continuous annular portion 128 and surfaces 126 extend radially inwardly from circumferentially continuous annular portion 128. Drive tabs 114 and 116 extend past annular portion 128 in axial direction AD1.

In the example of FIG. 10, output flange 102 includes radially outwardly facing surfaces 142; and for each surface 126, a respective centering tab 204 extends from surface 126 at least partially in axial direction AD1. In an example embodiment, the respective centering tabs 204 extend from surface 126 only in direction AD1. Centering tabs 204 are in contact with surfaces 142, and contact between tabs 204 and surfaces 142 centers intermediate flange 302 with respect to output flange 102 and axis of rotation AR. Each centering tab 204 is circumferentially located between a respective pair of drive tabs 114 and drive tabs 116.

In the example of FIG. 10, torsional vibration damper 100 includes cover plate 130 and cover plate 132, non-rotatably connected to cover plate 130. Cover plate 130 includes: drive surfaces 134 directly engaged ends 118; and drive surfaces 136 directly engaged with ends 124. Cover plate 132 includes: drive surfaces 138 directly engaged ends 118; and drive surfaces 140 directly engaged with ends 124.

Figure 15:
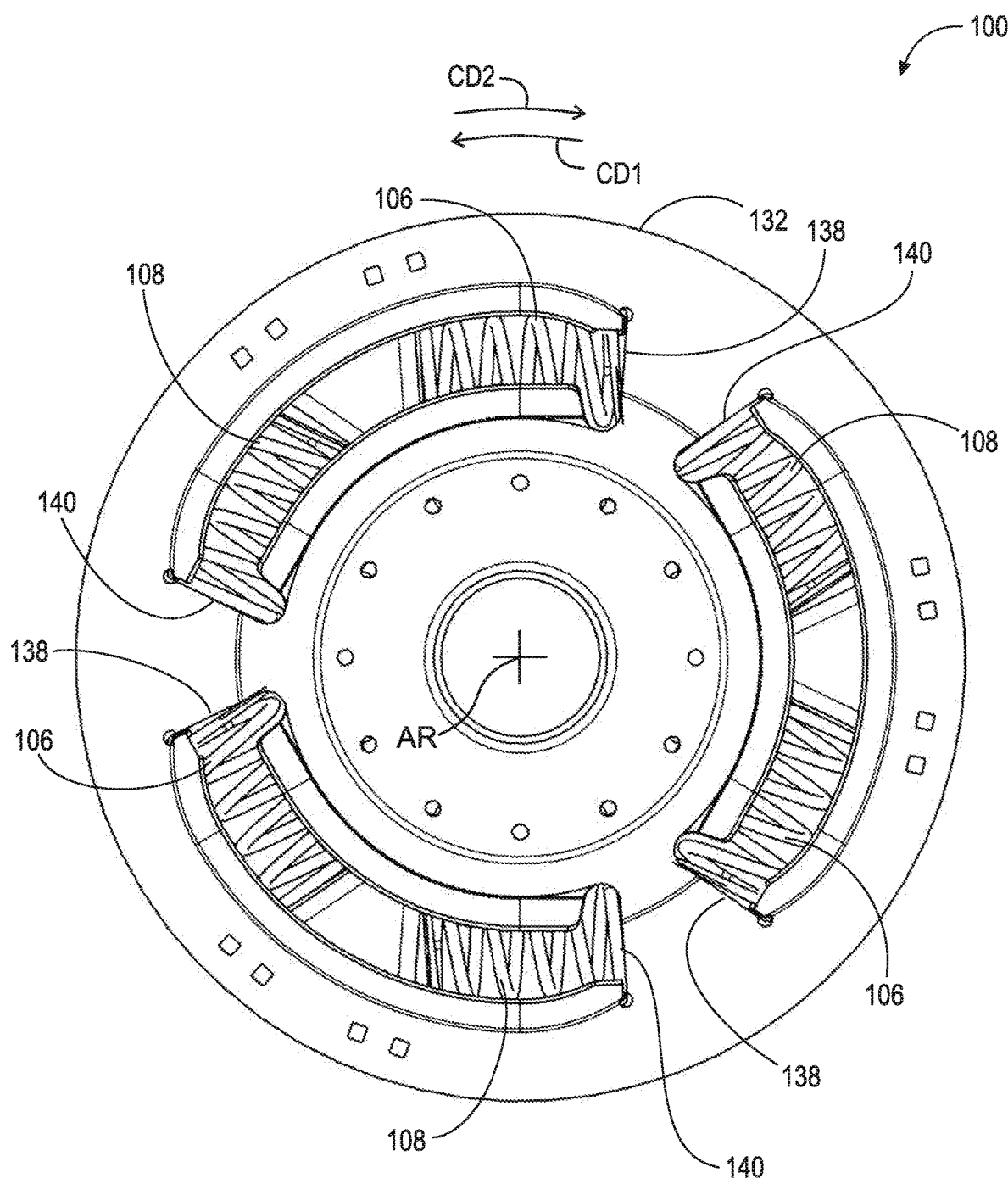
FIG. 15 is a back view of the torsional vibration damper shown in FIG. 1.

FIG. 15 a back view of the torsional vibration damper shown in FIG. 11. The following should be viewed in light of FIGS. 11 through 15 and provides further detail regarding the structure and operation of torsional vibration damper 100. Cover plates 130 and 132 are arranged to receive rotational torque, for example, rotational torque RT1 in direction CD1, and rotate in the direction in which the torque is transmitted, for example direction CD1. Cover plates 130 and 132, via drive surfaces 134 and 138, are arranged to transmit rotational torque RT1 to springs 106. Springs 106 are arranged to transmit rotational torque RT1 to intermediate flange 104 via drive tabs 114, and intermediate flange 104 is arranged to rotate in direction CD1. Intermediate flange 104, via drive tabs 116, is arranged to transmit rotational torque RT1 to springs 108. Springs 108 are arranged to transmit, via drive surfaces 112, rotational torque RT1 to output flange 102. Output flange 102 is arranged to rotate in direction CD1, and transmit rotational torque RT1 to a device (not shown), such as a shaft, non-rotatably connected to output flange 102.

Figure 16:
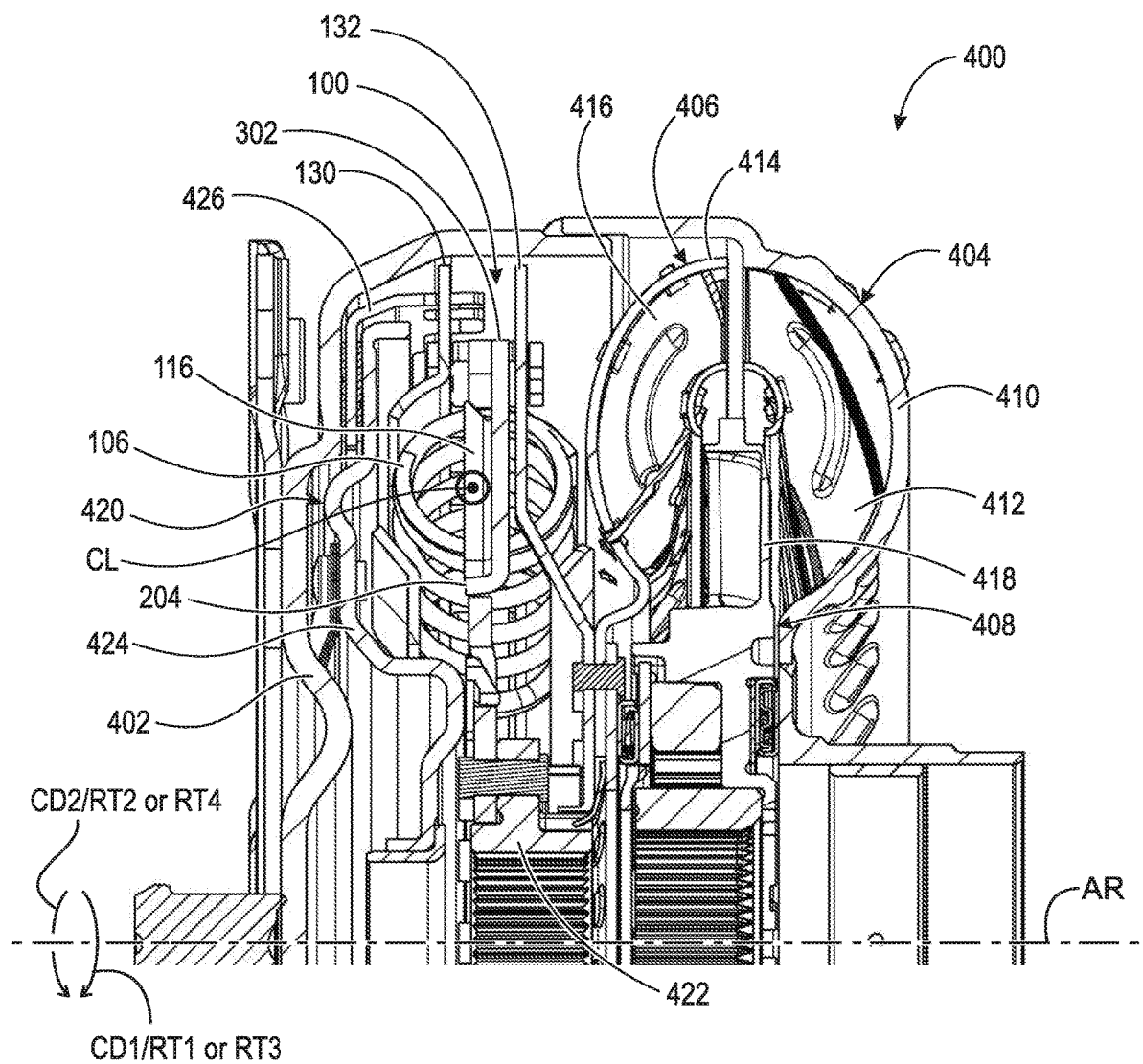
FIG. 16 is a cross-sectional view of a torque converter including the torsional vibration damper shown in FIG. 11.

FIG. 16 is a cross-sectional view of torque converter 400 including torsional vibration damper shown 100 in FIG. 11. The following should be viewed in light of FIGS. 11-16. It is understood that torsional vibration damper shown 100 in FIG. 1 or in FIG. 6 can be installed in torque converter 400 and that the discussion below directed to torque converter 400 and torsional vibration damper shown 100 in FIG. 1 is applicable to torque converter 400 and torsional vibration damper shown 100 in FIG. 1 or FIG. 6.

Torque converter 400 includes: cover 402 arranged to receive rotational torque RT1 or rotational torque RT2; impeller 404; turbine 406; stator 408 and torsional vibration damper shown 100 in FIG. 11. Impeller 404 includes: impeller shell 410 non-rotatably connected to cover 402; and at least one impeller blade 412 fixed to impeller shell 410. Turbine 406 is in fluid communication with impeller 404 and includes: turbine shell 414; and at least one impeller blade 416 fixed to turbine shell 414. Stator 408 includes at least one stator blade 418 between impeller 404 and turbine 406.

Torque converter 400 includes: lock-up clutch 420 and output hub 422, non-rotatably connected to output flange 102. Lock-up clutch 420 includes piston plate 424 and drive plate 426. Output hub 422 is arranged to non-rotatably connect to an input shaft (not shown) of a transmission. Drive plate 426 is non-rotatably connected to cover plate 130. Cover plate 132 is non-rotatably connected to turbine shell 414.

In a torque converter mode of torque converter 400, cover 402 receives rotational torque, for example, torque RT3 in direction CD1. Lock-up clutch 420 is open, and cover 402 and impeller shell 410 are rotatable with respect to piston plate 424. The rotation of impeller shell 410 and the fluid communication of turbine 406 with impeller 404 multiplies torque RT3 on turbine shell 414, for example, generating torque RT1. Torque RT1 is transmitted to damper 100 by cover plate 132 and damper 100 operates as described above for FIGS. 11 through 15. Output hub 422 transmits torque RT1 to the transmission input shaft.

In a lock-up mode of torque converter 400, cover 402 receives rotational torque, for example, torque RT1 in direction CD1. Lock-up clutch 420 is closed, and cover 402, drive plate 426, and cover plate 130 are non-rotatably connected. Thus, impeller 404 and 406 are substantially by-passed, and torque RT1 is transmitted to cover plate 130 and damper 100. Damper 100 operates as described above for FIGS. 11 through 15. Output hub 422 transmits torque RT1 to the transmission input shaft.

The following should be viewed in light of FIGS. 1 through 15. The following describes a method of operating torsional vibration damper 100. Although the method is presented as a sequence of steps for clarity, no order should be inferred from the sequence unless explicitly stated. A first step receives, with cover plate 130, rotational torque RT1 in circumferential direction CD1. A second step rotates cover plate 130 around axis of rotation AR. A third step transmits rotational torque RT1 to ends 118 of springs 106 directly engaged with cover plate 130. A fourth step transmits, with ends 120 of springs 106, rotational torque RT1 to drive tabs 114, directly engaged with ends 120. A fifth step rotates intermediate flange 302 in circumferential direction CD1. A sixth step transmits, with drive tabs 116, rotational torque RT1 to ends 122 of springs 108, directly engaged with drive tabs 116. A seventh step transmits, with ends 124 of springs 108, rotational torque RT1 to drive surfaces 112, directly engaged with ends 124. An eighth step rotates output flange 102 in circumferential direction CD1.

In an example embodiment, the seventh step includes transmitting torque RT1 to drive surfaces 112 overlapping drive tabs 114 and drive tabs 116 in circumferential direction CD1. In an example embodiment the fifth step includes centering intermediate flange 202 or 302, with respect to output flange 102, using centering tabs 204 in contact with radially outwardly facing surfaces 142.

In an example embodiment: the fourth step includes transmitting rotational torque RT1 to drive tabs 114 through which hypothetical circumferential center line CL passes; and the sixth step includes transmitting rotational torque RT1 with drive tabs 116 through which hypothetical circumferential center line CL passes.

As noted above, for known in-line torsional vibration dampers, only one of the intermediate flange or the output flange is centered on a circumferential center line of the springs of the vibration damper. The off-center flange causes an unequal distribution of loads on the springs and bending of the springs. With output flange 102 axially centered on center line CL, drive tabs 114 and 116 extend past annular portion 128 of intermediate flanges 104 and 302 in axial direction AD1 to align with and overlap circumferential line CL of springs 106 and 108, which passes through drive surfaces 110 and 112. Stated differently, drive tabs 114 and 116 are axially off-set from annular portion 128 in axial direction AD1 to align with center line CL in direction CD1. Thus, the loading on springs 106 and 108 from flanges 102, 104, and 302 is equalized and bending of the springs is eliminated, improving the operation of torsional vibration damper 100 and increasing the durability of torsional vibration damper 100.

Centering tabs 204 enable radial centering, within the limited axial space between cover plates 130 and 132, of intermediate flanges 202 and 302 with respect to output flange 102 and axis of rotation AR.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
CL center line
RT1 rotational torque
RT2 rotational torque
RT3 rotational torque
100 torsional vibration damper
102 output flange
104 intermediate flange
106 spring
108 spring
110 drive surface 112 drive surface
114 drive tab
116 drive tab
117 surface
118 end, spring 106
120 end, spring 106
122 end, spring 108
124 end, spring 108
126 surface, intermediate flange
128 annular portion, intermediate flange
130 cover plate
132 cover plate
134 drive surface
136 drive surface
138 drive surface
140 drive surface
142 radially outwardly facing surface
202 intermediate flange
204 centering tab
206 drive surface
208 drive surface
302 intermediate flange
400 torque converter
402 cover
404 impeller
406 turbine
408 stator
410 impeller shell
412 impeller blade
414 turbine shell
416 turbine blade
418 stator blade
420 lockup clutch
422 output hub
424 piston plate
426 drive plate

The invention claimed is:

1. A torsional vibration damper, comprising:
an output flange supported for rotation around an axis of rotation and including a first drive surface and a second drive surface;
an intermediate flange including:
a first drive tab aligned in series with the first drive surface in a circumferential direction around the axis of rotation; and
a second drive tab aligned in series with the second drive surface in the circumferential direction;
a first spring including:
a first end directly engaged with the first drive surface; and
a second end directly engaged with the first drive tab; and
a second spring including:
a first end directly engaged with the second drive tab; and
a second end directly engaged with the second drive surface, wherein the output flange includes a radially outwardly facing surface; and the intermediate flange includes a centering tab:
in contact with the radially outwardly facing surface; and
arranged to center the intermediate flange with respect to the output flange.

2. The torsional vibration damper of claim 1, wherein:
the first drive tab overlaps the first drive surface and the second drive surface in the circumferential direction; and
the second drive tab overlaps the first drive surface and the second drive surface in the circumferential direction.

3. The torsional vibration damper of claim 1, wherein:
the intermediate flange includes a first surface facing at least partially in a first axial direction parallel to the axis of rotation; and
the first drive tab and the second drive tab extend from the first surface at least partially in a second axial direction, opposite the first axial direction.

4. The torsional vibration damper of claim 3, wherein:
the intermediate flange includes a circumferentially continuous annular portion; and
the first surface extends radially inwardly from the circumferentially continuous annular portion.

5. The torsional vibration damper of claim 1, wherein a hypothetical center line of the first spring and of the second spring passes through in the circumferential direction and in sequence:
the first drive surface;
the first drive tab;
the second drive tab; and
the second drive surface.

6. The torsional vibration damper of claim 1, further comprising:
a first cover plate overlapping the output flange and the intermediate flange in an axial direction parallel to the axis of rotation, the first cover plate including:
a first surface directly engaged with the first end of the first spring; and
a second surface directly engaged with the second end of the second spring.

7. The torsional vibration damper of claim 6, wherein:
the first cover plate is arranged to:
receive a rotational torque in the circumferential direction; and
transmit the rotational torque to the first spring;
the first spring is arranged to transmit the rotational torque to the intermediate flange;
the intermediate flange is arranged to transmit the rotational torque to the second spring; and
the second spring is arranged to transmit the rotational torque to the output flange.

8. The torsional vibration damper of claim 6, further comprising:
a second cover plate non-rotatably connected to the first cover plate, the second cover plate including:
a first surface directly engaged with the first spring; and
a second surface directly engaged with the second spring, wherein the output flange and the intermediate flange are axially disposed between the first cover plate and the second cover plate.

9. A torsional vibration damper, comprising:
an output flange supported for rotation around an axis of rotation and including a radially outwardly facing surface;
an intermediate flange including a centering tab in contact with the radially outwardly facing surface and arranged to center the intermediate flange with respect to the output flange;
a first spring including:
a first end directly engaged with the output flange; and
a second end directly engaged with the intermediate flange; and
a second spring including:
a first end directly engaged with the intermediate flange; and
a second end directly engaged with the output flange.

10. The torsional vibration damper of claim 9, wherein:
the output flange includes a first drive surface and a second drive surface;
the intermediate flange includes:
  a first drive tab overlapping the first drive surface in a circumferential direction around the axis of rotation; and
  a second drive tab overlapping the first drive surface in the circumferential direction;
the first end of the first spring is directly engaged with the first drive surface;
the second end of the first spring is directly engaged with the first drive tab;
the first end of the second spring is directly engaged with the second drive tab; and
the second end of the second spring is directly engaged with the second drive surface.

11. The torsional vibration damper of claim 10, wherein:
the first drive tab overlaps the first drive surface in an axial direction parallel to the axis of rotation; and
the second drive tab overlaps the first drive surface in the axial direction.

12. The torsional vibration damper of claim 10, wherein:
the intermediate flange includes a first surface facing at least partially in a first axial direction parallel to the axis of rotation; and
the first drive tab and the second drive tab extend from the first surface at least partially in a second axial direction, opposite the first axial direction.

13. The torsional vibration damper of claim 12, wherein:
the intermediate flange includes a circumferentially continuous annular portion; and
the first surface of the intermediate flange extends radially inwardly from the circumferentially continuous annular portion.

14. The torsional vibration damper of claim 10, wherein:
the centering tab is circumferentially located between the first drive tab and the second drive tab; or
the centering tab is radially inward of the first drive tab and the second drive tab.

15. The torsional vibration damper of claim 10, wherein a hypothetical center line of the first spring and of the second spring passes through in the circumferential direction and in sequence:
the first drive surface;
the first drive tab;
the second drive tab; and
the second drive surface.

16. The torsional vibration damper of claim 9, further comprising:
a first cover plate overlapping the output flange and the intermediate flange in an axial direction parallel to the axis of rotation, wherein the first cover plate includes:
  a first surface directly engaged with the first end of the first spring; and
  a second surface directly engaged with the second end of the second spring.

17. The torsional vibration damper of claim 16, wherein:
the first cover plate is arranged to:
  receive a rotational torque in a circumferential direction around the axis of rotation; and
  transmit the rotational torque to the first spring;
the first spring is arranged to transmit the rotational torque to the intermediate flange;
the intermediate flange is arranged to transmit the rotational torque to the second spring; and
the second spring is arranged to transmit the rotational torque to the output flange.

18. A method of operating a torsional vibration damper, comprising:
receiving, with a cover plate of the torsional vibration damper, a rotational torque in a circumferential direction; rotating, in the circumferential direction, the cover plate around an axis of rotation of the torsional vibration damper;
transmitting, the rotational torque to a first end of a first spring of the torsional vibration damper, the first end directly engaged with the cover plate;
transmitting, with a second end of the first spring, the rotational torque to a first drive tab of an intermediate flange of the torsional vibration damper, the first drive tab directly engaged with the first end of the first spring;
rotating the intermediate flange in the circumferential direction;
transmitting, with a second drive tab of the intermediate flange, the rotational torque to a first end of a second spring of the torsional vibration damper, the first end of the second spring directly engaged with the second drive tab;
transmitting, with a second end of the second spring, the rotational torque to a drive surface of an output flange of the torsional vibration damper, the second end of the second spring directly engaged with the drive surface; and
rotating the output flange in the circumferential direction, wherein:
  rotating the intermediate flange in the circumferential direction includes centering the intermediate flange, with respect to the output flange, using a centering tab of the intermediate flange in contact with a radially outwardly facing surface of the output flange.

19. The method of claim 18, wherein:
transmitting, with the second end of the first spring, the rotational torque to the first drive tab of the intermediate flange includes transmitting the rotational torque to the first drive tab through which a hypothetical circumferential center line of the first spring passes; and
transmitting, with the second drive tab of the intermediate flange, the rotational torque to the first end of the second spring includes transmitting the rotational torque with the second drive tab through which a hypothetical circumferential center line of the second spring passes.

* * * * *